May 29, 1962 W. G. BIHLER 3,036,488
APPARATUS FOR REFORMING AND RELOADING USED CARTRIDGES
Filed July 17, 1959 9 Sheets-Sheet 2

Fig.2

INVENTOR.
WALTER G. BIHLER
BY Edward M. Apple
ATTORNEY

May 29, 1962 W. G. BIHLER 3,036,488
APPARATUS FOR REFORMING AND RELOADING USED CARTRIDGES
Filed July 17, 1959 9 Sheets-Sheet 3

INVENTOR.
WALTER G. BIHLER
BY Edward M. Apple
ATTORNEY

May 29, 1962 W. G. BIHLER 3,036,488
APPARATUS FOR REFORMING AND RELOADING USED CARTRIDGES
Filed July 17, 1959 9 Sheets-Sheet 4

INVENTOR.
WALTER G. BIHLER
BY Edward M. Apple
ATTORNEY

United States Patent Office 3,036,488
Patented May 29, 1962

3,036,488
APPARATUS FOR REFORMING AND RELOADING USED CARTRIDGES
Walter G. Bihler, Franklin Village, Mich., assignor to Magnamatic Tool and Engineering, Inc., St. Clair Shores, Mich., a corporation of Michigan
Filed July 17, 1959, Ser. No. 827,883
7 Claims. (Cl. 86—26)

This invention relates to small arms ammunition and has particular reference to method and means for re-loading used cartridge shells. An object of the invention is to provide an automatic production machine for re-loading used cartridges.

Another object of the invention is to provide an automatic cartridge re-loading machine which is compact, simple in construction, economical to manufacture and efficient in operation.

Another object of the invention is to provide a device of the character indicated which is automatic in operation and requires but a single source of power for all of its working operations.

Another object of the invention is to provide a device of the character indicated in which all operating stations are controlled by means of a single cam shaft yet each station is individually adjustable for various degrees of work.

Another object of the invention is to provide a machine of the character indicated in which there is a single cam shaft for controlling all operations thereby eliminating all timing problems.

Another object of the invention is to provide a machine of the character indicated which is constructed and arranged so that the working parts are easily adjustable and readily accessible for set up, changes and replacement.

Another object of the invention is to provide an automatic machine of the character indicated in which the power source may be readily disconnected and a manual means is provided for motivating the machine when close adjustments are to be made.

Another object of the invention is to provide a machine of the character indicated in which the shells to be re-loaded are selected in one position and are inverted into working position by the utilization of structural features inherent to the shells.

Another object of the invention is to provide a device of the character indicated in which the cartridge shells to be worked upon are advanced from working station to working station by novel means.

A further object of the invention is to provide an automatic machine which will select, decap, re-size, install a new primer, measure and load powder in the shells, install and crimp the new bullet all without manual interference, or attention.

Another object of the invention is to provide a device of the character indicated in which a multiplicity of cartridge shells are advanced simultaneously from station to station while all of the work tools are being held in inactive position.

Another object of the invention is to provide an automatic machine for re-loading cartridges which may be operated by non-expert re-loaders.

The foregoing and other objects and advantages of the invention will become more apparent as the description proceeds, reference being made from time to time to the accompanying drawings, forming part of the within disclosure in which drawings.

Referring now more particularly to the drawings, it will be understood that in the embodiment herein disclosed the reference character 17 indicates the base of the machine embodying the invention, on which base is mounted for rotation a cam shaft 18 and a rocker arm shaft 19, which are journaled in suitable bearings 20 and 21, which bearings are secured to, and supported by, a casting 22 which comprises one of the main structural parts of the machine.

The cam shaft 18 and the rocker arm shaft 19 are driven by means of a suitable electric motor 23, through a gear reduction 24, sprockets 25 and 26, and a chain 27. The sprocket 25 is splined on the shaft 28, so that it may be moved out of driving position on the shaft 28, thereby disconnecting the driving motor 23 from the rest of the machine, whereby the machine may be manually operated, for making close adjustments, by turning the hand wheel 29, which is keyed to the cam shaft 18. This is an important feature of the invention as it enables the operator to make fine adjustment to the mechanism comprising the working stations, hereinafter described.

Mounted at the opposite end of the machine is a hopper 30, in which can be deposited a plurality of used cartridges to be worked upon by the machine. The hopper 30 is mounted on a stationary bracket 31, which is secured to the casting 22 and to a drive gear housing 32. Mounted for rotation inside the hopper 30 is a stiff, wire brush 33, which is secured to an arm 34, which is pivoted as at 35, for rotation with a spindle 36, which is driven by a suitable gear train, housed in the gear drive housing 32, which gear train is driven by means of a sprocket 37, a chain 38 and a sprocket 39 secured to the end of the cam shaft 18.

Figure 1:
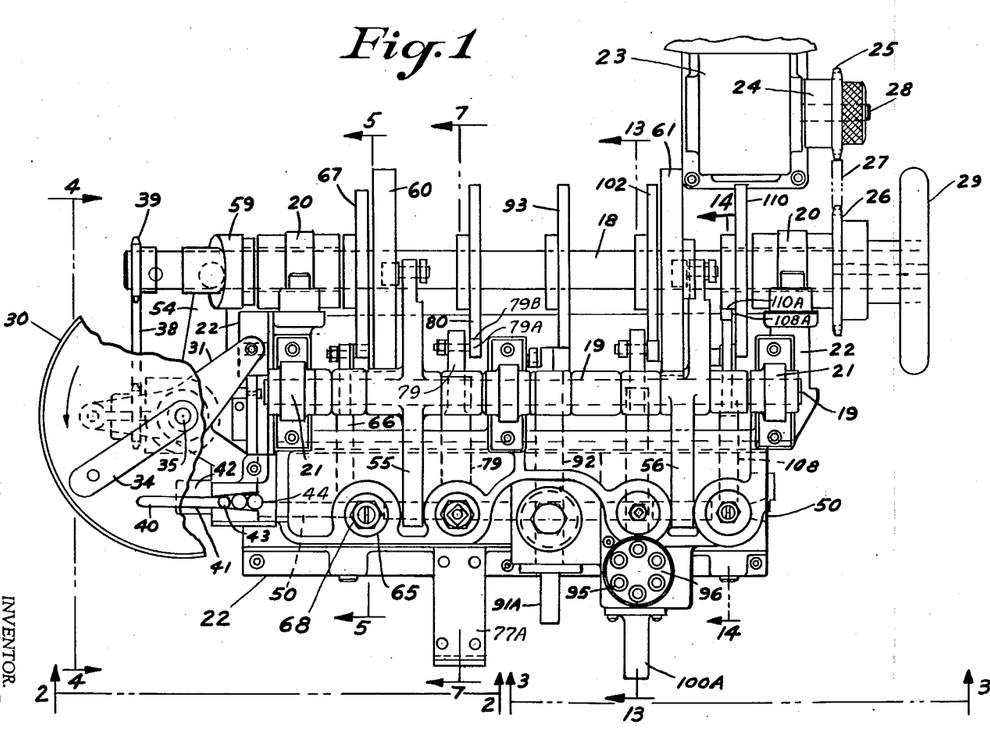
FIG. 1 is a plan view of a device embodying the invention.
Figure 2:
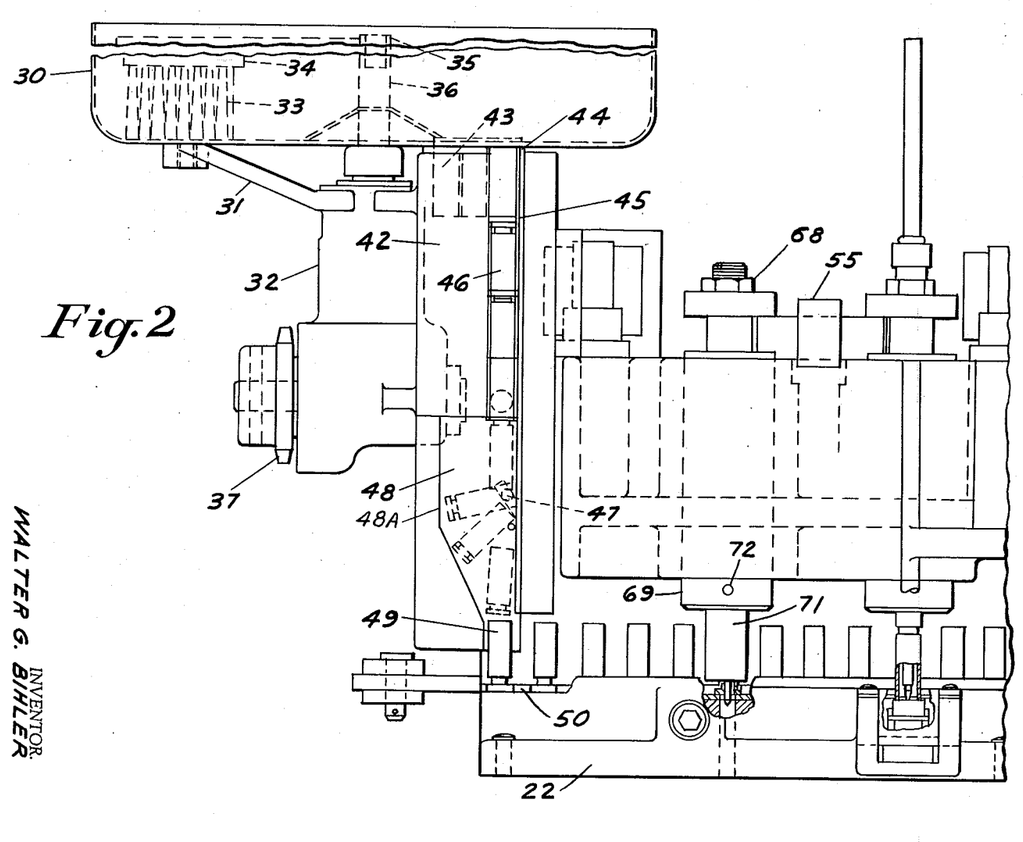
FIG. 2 is a front elevational view, taken substantially on the line 2—2 of FIG. 1 and illustrates the left half of the machine illustrated in FIG. 1.
Figure 3:
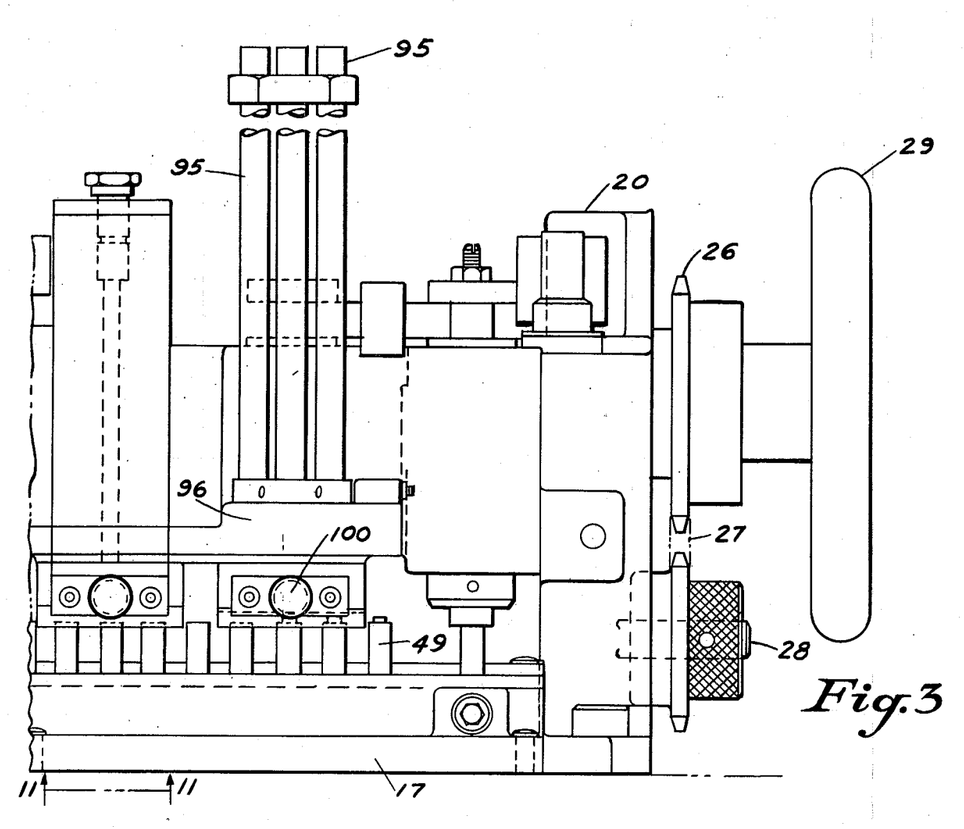
FIG. 3 is an elevational view, taken substantially on the line 3—3 of FIG. 1 and illustrates the right half of the machine shown in FIG. 1.

The bottom of the hopper 30 is provided with a slot 40, FIG. 1, which communicates with a slot 41, provided in a guide member 42, which is formed as an integral part of the casting 22, or may be an independent member secured to the casting 22 by any suitable means. Cartridges deposited in the hopper 30 are tumbled about therein by means of the wire brush 33, and when such cartridges are in the proper position, as shown at 43, they are received, with the open end down, in the slot 40 and are advanced into the continuation of the slot 41, by the sweeping action of the brush 33. When the cartridges are fully advanced in the slots 40 and 41, they reach an enlarged portion 44 formed in the slot 41 and fall into a chute 45, (FIG. 2), which carries them to the shuttle mechanism as hereinafter described.

Figure 4:
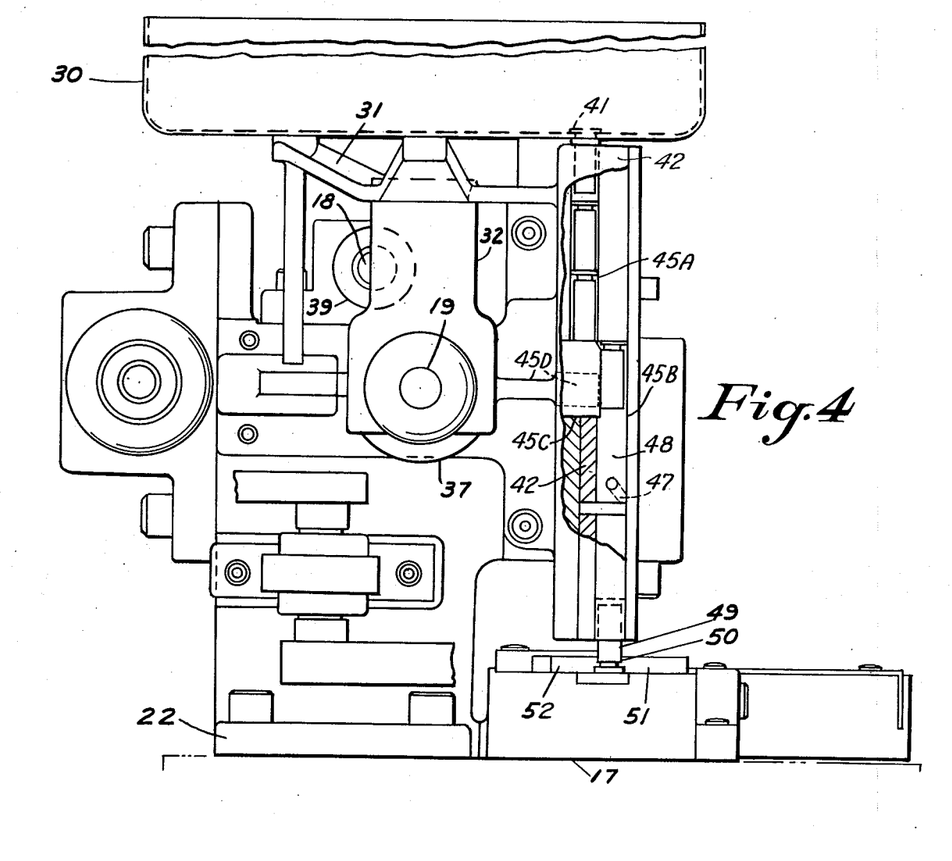
FIG. 4 is an elevational view, taken substantially on the line 4—4, of FIG. 1.

The chute 45 is in two sections 45A and 45B (FIG. 4) offset from each other. The section 45A terminates in a shoulder 45C formed in the member 42 which serves as a stop for the cartridges on which they fall open end down. On each revolution of the cam shaft 18, a reciprocable arm 45D is actuated by a cam to push a cartridge into the chute section 45B.

The cartridges 46 descend by gravity in the chute section 45B, until they encounter open end down a pin 47, angularly positioned in an enlarged portion 48, which pin causes the cartridges to be inverted in the chute section 45B, so that they may be received, as at 49, with their closed end downward, in which condition they are received in a guide-way 50, which extends from one side to the other of the machine, as shown in FIG. 1. The pin 47 also serves as a safety element, as it will not let a loaded cartridge pass. The pin 47 (FIG. 2) must enter the open end of the cartridge to permit the closed end of the cartridge to clear the opposite wall 48A of the area 48, in the inversion operation. The guide-way 50 is preferably formed of two or more lengths of metal 51 and 52, which are secured by any suitable means to the base member 17. The members 51 and 52 are machined to provide a substantially inverted T-like slot, through which the cartridges 49, (FIG. 4), may be advanced from station to station, across the machine as hereinafter described.

Figures 9, 10:
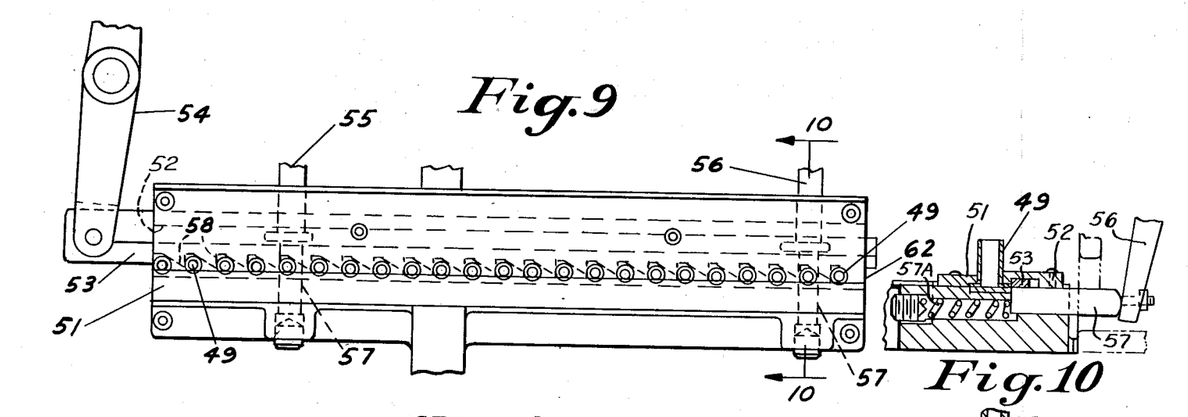
FIG. 9 is a plan view, with parts broken away, of the shuttle mechanism employed in advancing the cartridges from station to station.
FIG. 10 is a section taken substantially on the line 10—10 of FIG. 9.

The cartridges 49 are advanced from left to right in the machine, (FIG. 1), by means of a comb-like shuttle 53 (FIG. 9). The shuttle 53 is in the form of a slide, which is arranged for rectangular motion, under the influence of the arm 54, which reciprocates the slide 53 longitudinally, and the arms 55 and 56 which move the slide 53 laterally in one direction, the slide 53 being returned in the opposite direction by means of springs 57A in the extensions 57. The slide 53 is serrated, as at 58, to provide a multiplicity of teeth, each tooth of which is arranged to receive and advance a cartridge 49, on each forward motion of the slide 53. The arms 54, 55 and 56 are actuated by suitable cams 59, 60 and 61 carried by the cam shaft 18. On each rotation of the cam shaft 18, the slide 53 makes a rectangular movement, to advance all of the cartridges in contact with the teeth of the slide, and returns to the loading position. On each rotation of the cam shaft 18 the cartridges 49 are advanced the distance from tooth to tooth of the slide 53, and at each rotation of the cam shaft one of the cartridges 49, is moved into working position, at each of the working stations of the machine. All of the work is done almost simultaneously at each station, at predetermined positions of the cam shaft, and the working tools of all the stations are at rest at another position of the cam shaft. While the working tools are at rest the slide 53 advances the cartridges 49, the distance between two teeth of the slide 53. This is another important feature of the invention as it provides a fast production cycle, for upon each revolution of the cam shaft 18, an operation is being performed on one of the cartridges 49, at each respective work station. After the cartridges 49 have passed through the five work stations, comprising the machine, they are discharged from the machine, as at 62 (FIG. 9).

Figures 5, 6:
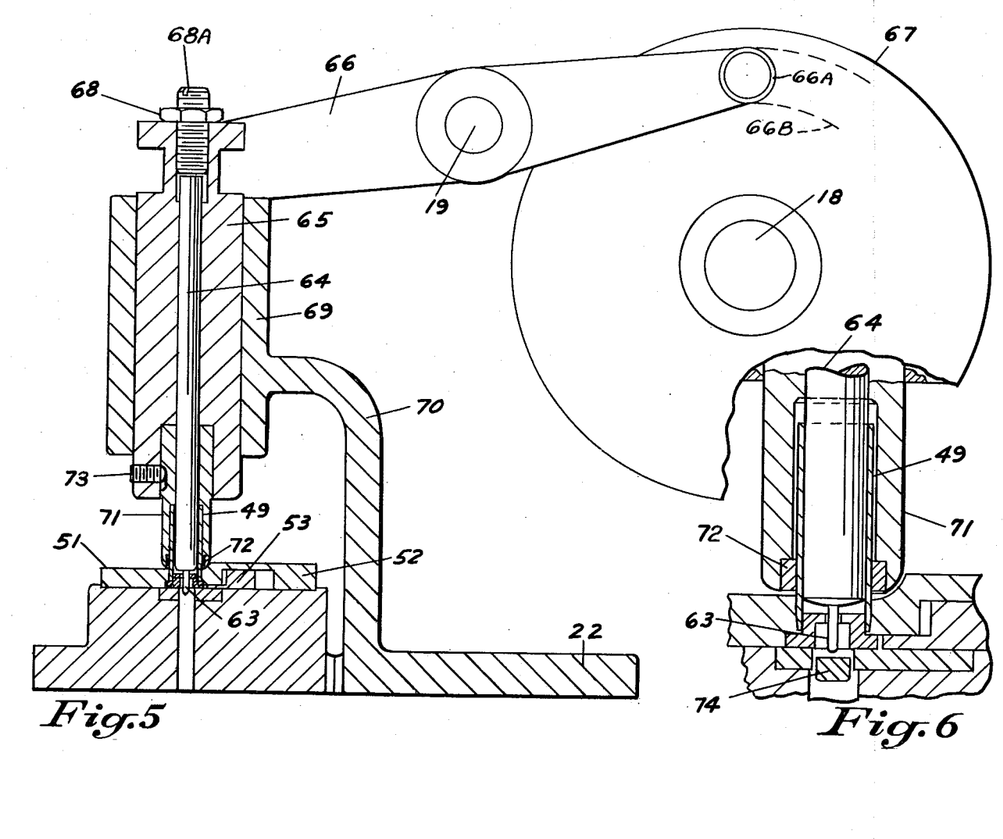
FIG. 5 is a vertical section, taken substantially on the line 5—5 of FIG. 1, and illustrates the first working station.
FIG. 6 is an enlarged, fragmentary detail, showing part of the apparatus illustrated in FIG. 5.

I will now describe the separate work stations of the machine. It will be understood that the machine, embodying the invention, is intended for use in reclaiming used cartridges, so that the cartridges may again be used for target practice and the like. In the embodiment of the machine herein disclosed, five working stations are provided. At the first station, shown in FIGS. 5 and 6, the cartridge 49 is decapped, that is, its primer is removed by means of a punch 63, which is formed as a reduced end of a rod 64, which is secured in a tool holder 65, which is mounted at the end of a rocker arm 66, which in turn is mounted on the rocker arm shaft 19 which has a cam follower 66A, which is actuated by the cam slot 66B formed on the wheel 67 carried on the cam shaft 18. Close adjustment of the tools at this station is provided by means of the threaded and slotted end 68A and and lock nut 68. The tool holder 65 is slideable in a suitable guide 69 which is mounted on a bracket 70, which forms part of the casting 22. In the same operation which de-caps the cartridge 49, the body of the cartridge 49 is re-sized by means of a re-sizing tool 71, which has a hardened insert 72. The tool 71 is secured in the tool holder 65 by means of a set screw 73. In FIG. 6, I show the primer 74, after it has been removed from the cartridge, and after the cartridge has been re-sized.

Figure 7:
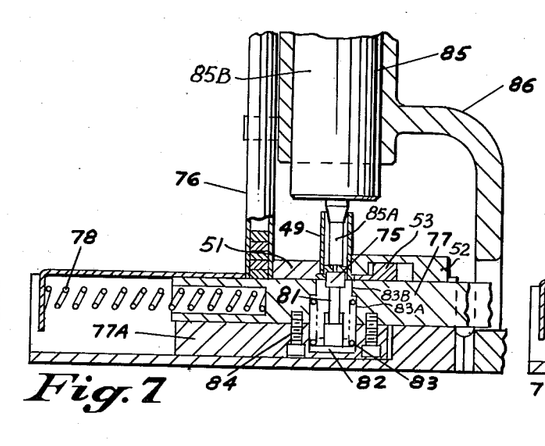
FIG. 7 is a vertical section, taken substantially on the line 7—7 of FIG. 1 and illustrates the second working station.
Figure 8:
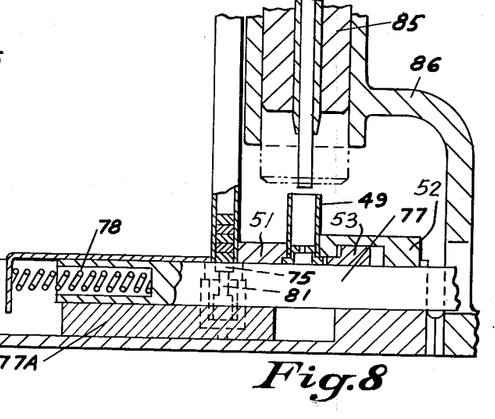
FIG. 8 is a view similar to FIG. 7, but shows the working parts in different positions.

After the first station, shown in FIGS. 5 and 6, the cartridge 49 is advanced toward the second station, which is illustrated in FIGS. 7 and 8. In this station a new primer 75 is received from a feeder tube 76, which is arranged to drop the primer into a slot formed in a slide 77, which reciprocates in a member 77A (FIGS. 1, 7, and 8) when the slide 77 has been moved against the compression spring 78, under the influence of a push rod 79 (FIG. 1) which carries a cam follower 79A, which is actuated by means of a cam surface 79B formed on the wheel 80 carried on the cam shaft 18. When the spring 78 returns the slide 77 to the position shown in FIG. 7, the primer 75 will rest on an anvil 81 having a base 82 which is supported on an extension 77A of the slide 77. The extension 77A is secured to the slide 77 by machine screws 84. The base 82 of the anvil 81 is spring-backed as at 83 and reciprocates in a slot 83A formed in the members 77 and 77A. The spring 83 gives resiliency to the anvil as the primer is forced into the cartridge. The slot 83A has a reduced portion 83B at the top for receiving the flange of the cartridge 49, when the latter is forced downwardly by the extension 85A of the tool 85B, which reciprocates in the tool holder 85.

Figures 11, 12:
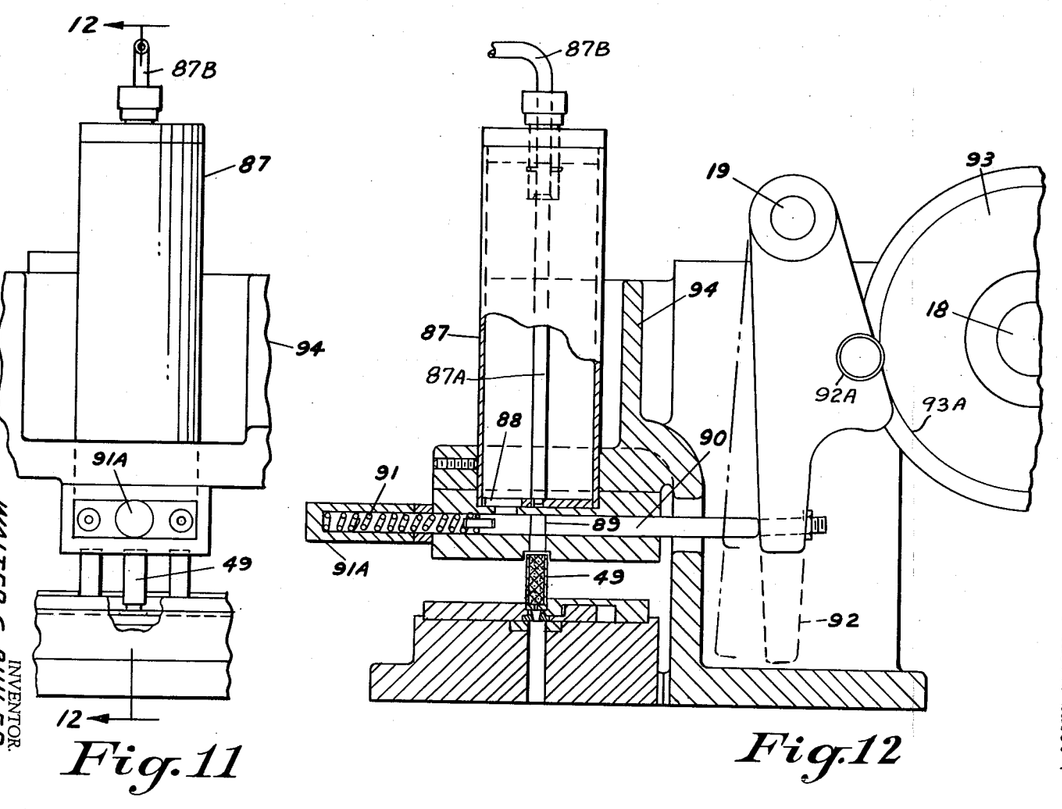
FIG. 11 is an elevational view of the third station of the machine as is, taken substantially on the line 11—11 of FIG. 3.
FIG. 12 is a section taken substantially on the line of 12—12 of FIG. 11.

The tool holder 85 is supported in a suitable bracket 86, comprising part of the casting 22, as previously described. After the cartridge 49 is provided with a new primer 75, it leaves the second station, shown in FIGS. 7 and 8, and moves on toward the third station, which is illustrated in FIGS. 11 and 12.

Figure 13:
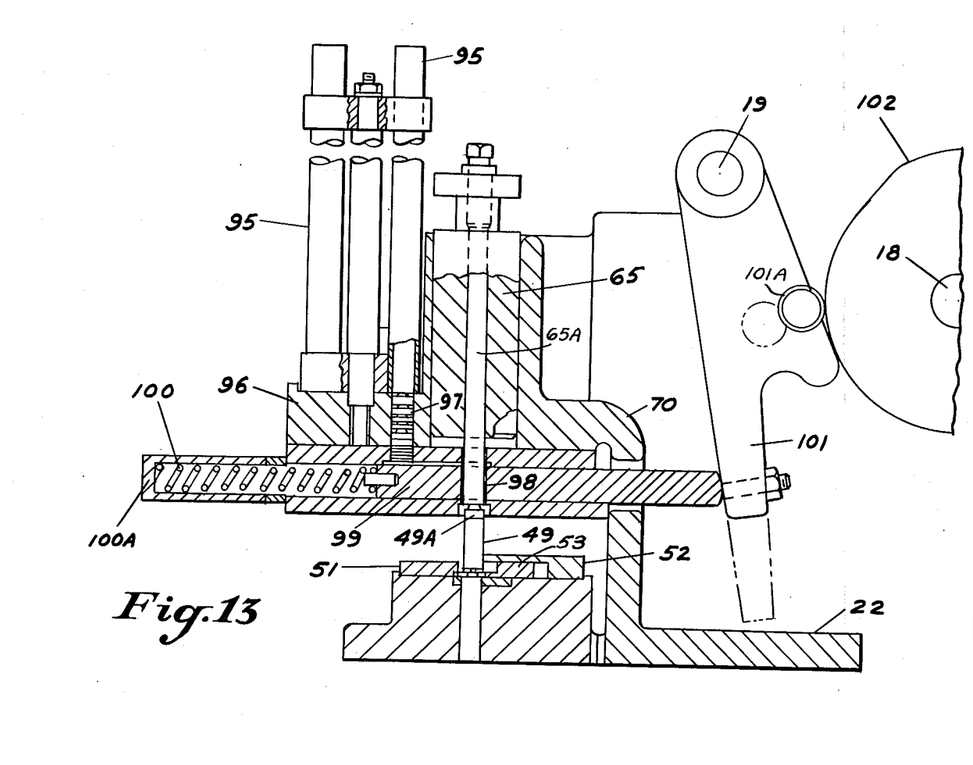
FIG. 13 is a vertical section, taken substantially on the line 13—13 of FIG. 1, and illustrates the fourth working station of the machine.

In this station, the cartridge 49 receives a measured amount of powder 50 from a powder receptacle 87, which has an opening 88 in the bottom which communicates with an opening 89 formed in a slide 90, which is spring-backed, as at 91, and is reciprocated by means of the arm 92, which is mounted on the rocker arm shaft 19 and is actuated by means of the cam follower 92A which rides on a cam surface 93A formed on the wheel 93, carried on the cam shaft 18. The spring 91 is housed in a spring retainer member 91A. The powder receptacle 87 is mounted on a suitable bracket 94, which may be an integral part of the casting 22. A shut-off member 87A having a hand grip 87B (FIG. 12) is provided so that the opening in the bottom of 87 may be closed, in the event it is desired to remove the member 87 from the machine, when it has powder therein. From station three, as illustrated in FIGS. 11 and 12, the cartridges 49 are advanced to station four, which is illustrated in FIG. 13.

In station four, a plurality of bullets are contained in the tubular members 95, which are supported on a manually rotated turret 96, which turret has openings 97 in communication with the tubular members 95, which openings 97 also communicate with an opening 98 formed in a slide 99, which is spring-backed, as at 100, which spring 100 is housed in a housing 100A. The slide 99 is actuated in one direction against the spring 100 by means of the arm 101, which is mounted on the rocker arm shaft 19, and is actuated by means of the cam follower 101A, which rides on the cam 102, which is mounted on the cam shaft 18. When the opening 98 in the slide 99 registers with the opening 97, a bullet is received in the opening 98, which bullet drops into the cartridge 49 when the slide 99 is returned to the position, as shown in FIG. 13, under the influence of the spring 100. The bullet 49A is pressed into the cartridge 49 by the tool 65A, which is held by the tool holder 65. After the bullet 49A is received in the cartridge 49, the cartridge 49 is then advanced toward the last station, which is number five by means of the shuttle 53.

Figure 14:
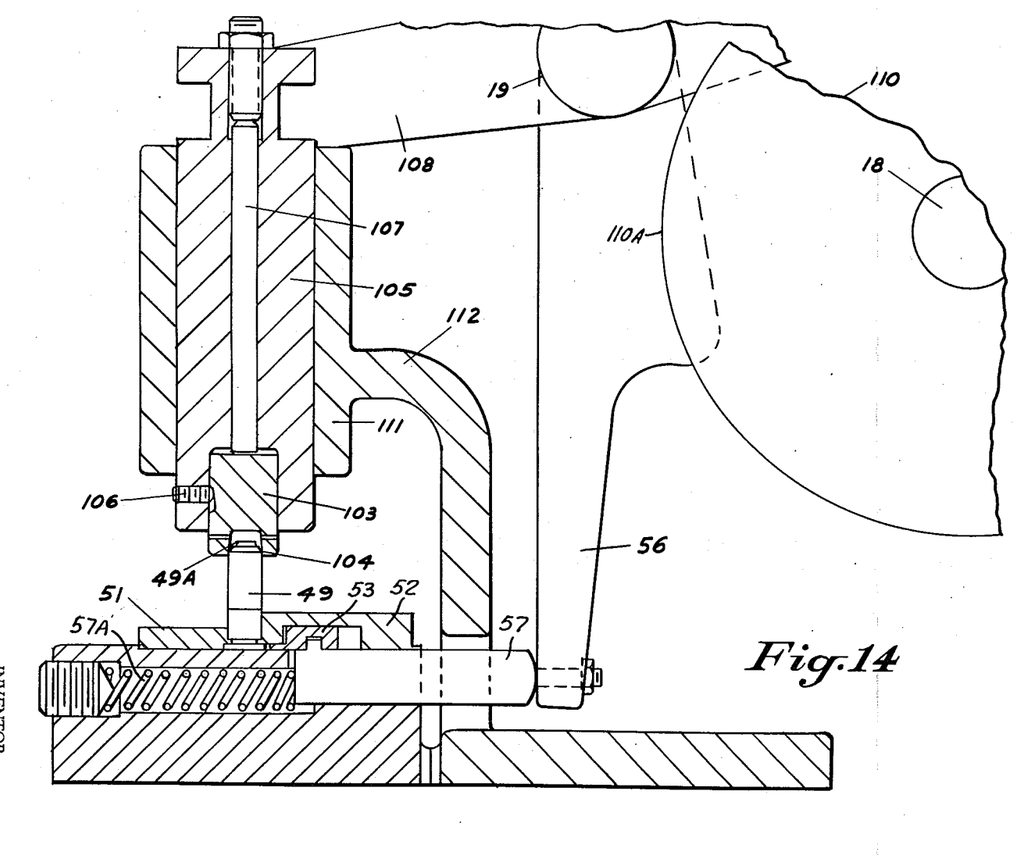
FIG. 14 is a section taken substantially on the line 14—14 of FIG. 1, and illustrates the fifth working station of the machine.

In FIG. 14, I illustrate station five, which is the crimping station. After the cartridge 49, has been provided with the bullet 49A, it is received at station five, where a crimping tool 103 is brought down on the cartridge 49 to crimp the edge, as shown at 104. The crimping tool 103 is secured in the tool holder 105 by means of a set screw 106. The tool holder 105 is mounted by means of a threaded rod 107 to a rocker arm 108, which is mounted on the rocker arm shaft 19 and is actuated by a cam follower 108A (FIG. 1) mounted at the end of the arm 108, which follower 108A rides on a cam surface 110A formed on the wheel 110, which is carried on the cam shaft 18. The tool holder 105 slides in a suitable guide 111, which is carried by the bracket 112, which forms part of the casting 22.

After the cartridges 49 are crimped, as described at station five, they are advanced from station five by the shuttle 53, to the discharge end 62, as previously described.

It is believed that the operation of the device is obvious from the foregoing description. From the foregoing, it will be seen that I have devised a novel method and apparatus for reclaiming, re-sizing, de-capping and re-loading cartridges in a fast production operation.

Having described my invention, what I claim and desire to secure by Letters Patent is;

1. In an automatic cartridge reloading machine, including a base member having means on said base for receiving cartridges and separate means for transporting said cartridges across the base to a multiplicity of work stations, the combination of a hopper for feeding said cartridges to said transporting means, said hopper having a slot in the bottom thereof, a rotatable brush in said hopper for forcing the cartridges into said slot, the said slot being constructed to receive cartridges, open end down, a chute having one end aligned with said first named means and the other end in communication with the said slot in said hopper for receiving cartridges from said hopper, there being means intermediate the ends of said chute for inverting said cartridges before they are received by said first named means.

2. The structure of claim 1, including a plurality of tools, in which said machine is provided with a common cam shaft for actuating a separate tool positioned at each of said stations, said cam shaft having cams thereon for actuating a plurality of reciprocable arms, a plurality of reciprocable arms, one of said arms being respectively connected to each of said tools, and at least two of said arms being reciprocable longitudinally and laterally and connected to said transporting means, whereby to move said last named means longitudinally and laterally.

3. The structure of claim 1, in which said transporting means include a reciprocable comb-shaped structure with fixed fingers for holding there between cartridges received from said hopper.

4. The structure of claim 1, including a plurality of reciprocable arms, in which said machine is power driven and is provided with a separate tool at each work station and a common cam shaft having cams thereon for actuating all of said tools, there being other cams on said shaft in contact with certain of said reciprocable arms which are movable longitudinally and laterally and are connected to said transporting means for giving longitudinal and lateral movement to said transporting means.

5. The structure of claim 1, in which the first work station removed from said hopper has a tool associated therewith for decapping and resizing the bodies of cartridges received from said hopper.

6. The structure of claim 1, in which one of said work stations has a resiliently mounted anvil associated therewith for use in installing new primers in the cartridges received from said hopper and transported by said second named means.

7. The structure of claim 1, including a plurality of tools in which said transporting means include a fixed fingered comb-shaped slide alignable with the chute from said hopper, and alignable with one of said tools positioned at each of said work stations.

References Cited in the file of this patent

UNITED STATES PATENTS

| | | |
|---|---|---|
| 986,349 | Berti | Mar. 7, 1911 |
| 1,602,334 | Candee | Oct. 5, 1926 |
| 2,297,730 | Turnock et al. | Oct. 6, 1942 |
| 2,800,830 | Gerstenberger | July 30, 1957 |

FOREIGN PATENTS

| | | |
|---|---|---|
| 24,917 | Great Britain | Dec. 6, 1901 |